Nov. 17, 1942.　　A. J. LOEPSINGER　　2,302,562
CONTROL MEANS
Filed Aug. 1, 1940　　3 Sheets-Sheet 1

Albert J. Loepsinger,
Inventor:
by Harry Dexter Reed Attorney

Nov. 17, 1942.  A. J. LOEPSINGER  2,302,562
CONTROL MEANS
Filed Aug. 1, 1940  3 Sheets-Sheet 2
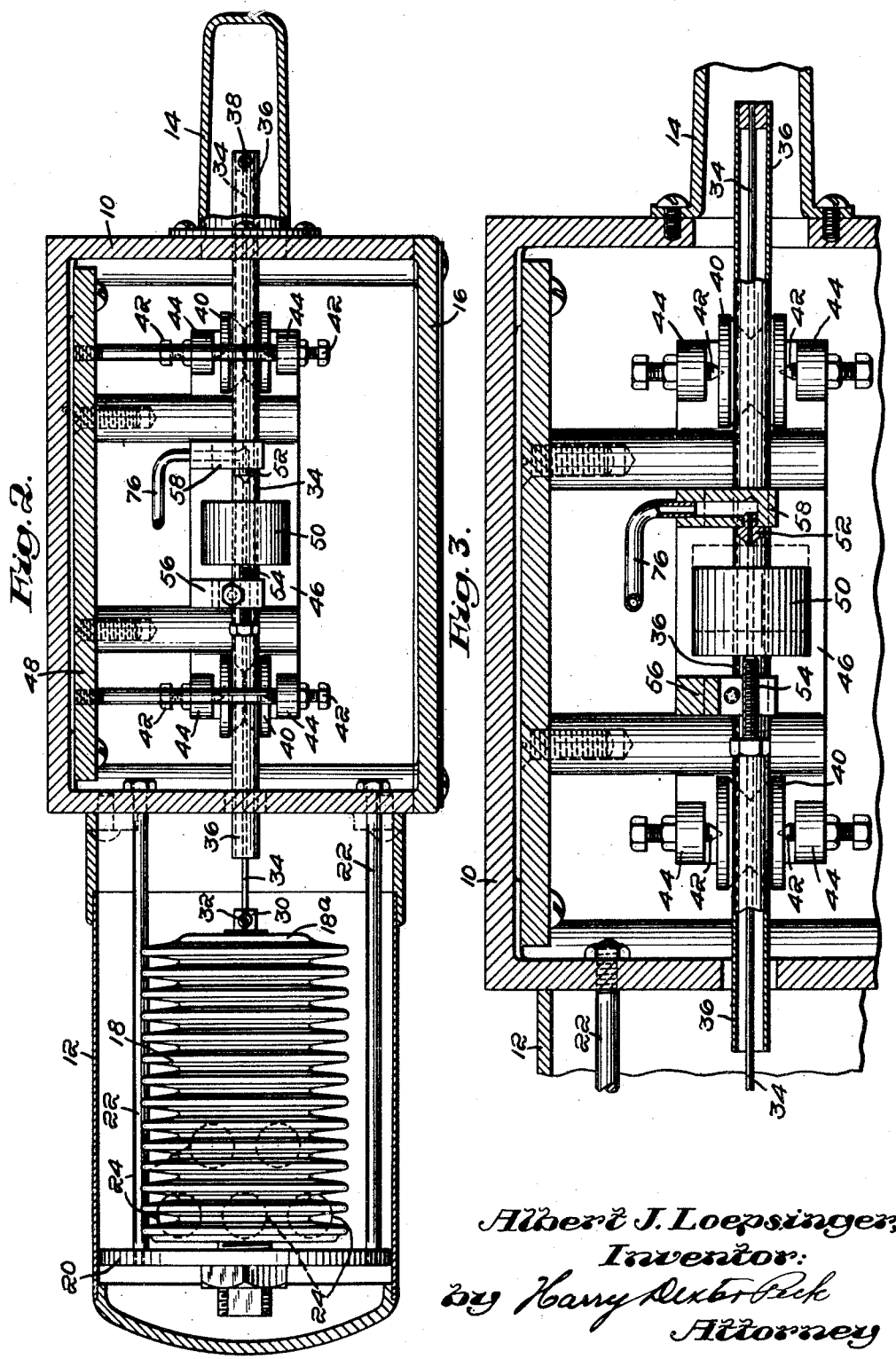
Albert J. Loepsinger,
Inventor;
by Harry Duxbury Peck
Attorney Nov. 17, 1942.     A. J. LOEPSINGER     2,302,562
CONTROL MEANS
Filed Aug. 1, 1940     3 Sheets-Sheet 3

Albert J. Loepsinger,
Inventor:
by Harry Dexter Peck
Attorney

Patented Nov. 17, 1942

2,302,562

UNITED STATES PATENT OFFICE 2,302,562

CONTROL MEANS

Albert J. Loepsinger, Providence, R. I., assignor to General Fire Extinguisher Company, Providence, R. I., a corporation of Delaware Application August 1, 1940, Serial No. 349,122

15 Claims. (Cl. 200—140)

This invention relates to improvements in control means. More especially it has to do with apparatus which is actuated by a change in a condition affecting it regardless of the precise condition at which such change takes place. The principles of my invention are herein disclosed in an instrument constructed and arranged to effect control in response to a rise in temperature, but it is to be understood that these principles are also applicable in a controller responsive to a fall in temperature or to a controller which is responsive to changes of pressure.

It is an object of my invention to provide apparatus which is rugged in construction, reliable in operation, and alertly sensitive to changes in a condition affecting it. It is a further feature to provide a simple adjustment for determining the maximum change of the condition effecting the control. As shown herein an instrument embodying my invention opens or closes an air vent to bring about a change of pressure which in turn causes an electric circuit to be made or broken. This particular arrangement of agencies is preferred, but the control might be exercised through pneumatic means alone, or through electric means alone, or through various combinations of both such means.

The best mode in which I have contemplated applying the principles of my invention is shown in the appended drawings, but these are to be deemed as merely illustrative for it is intended that the patent shall cover by suitable expression in the appended claims whatever features of patentable novelty exist in the invention disclosed.

In the accompanying drawings:

Figure 2 is a plan in section as on line 2—2 of Figure 1;

Figure 3 is a plan in section as on line 3—3 of Figure 1, drawn to a larger scale.

Figure 1:
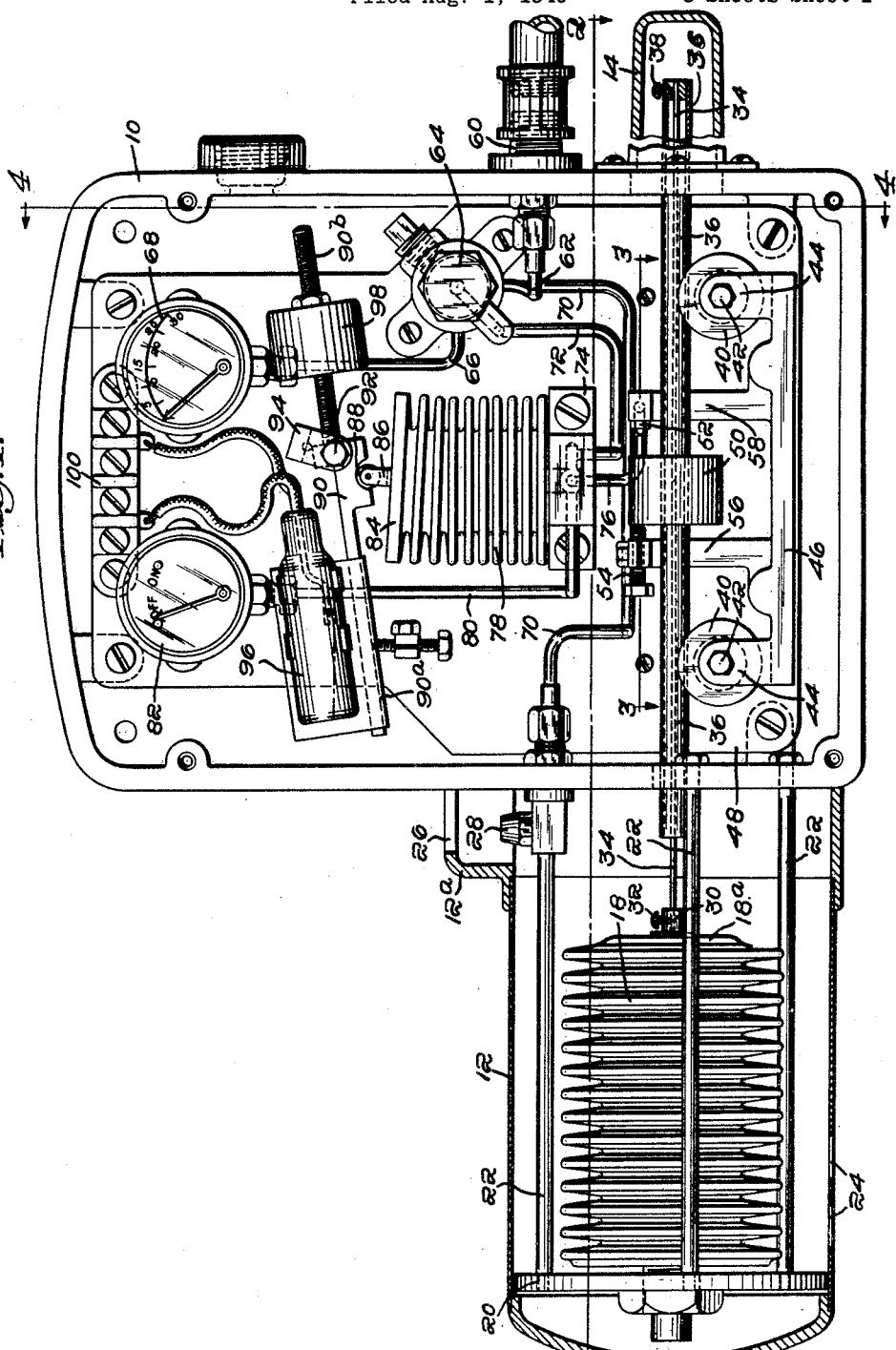
Figure 1 is a front elevation, of apparatus embodying my invention, with the auxiliary casings shown in section.

Referring more particularly to the drawings, the apparatus comprises a main body casing 10 with auxiliary casings 12 and 14 extending from each side thereof. The main casing cover 16 is removed in Fig. 1. In the auxiliary casing 12 is a horizontally disposed flexible bellows 18 having one end fastened to a plate 20 fixedly supported by rods 22 secured to the wall of the main body casing. The base portion of this auxiliary casing has perforations 24 and an upstanding portion 12a near the main casing has a top opening 26, through which air under pressure is discharged from a nozzle 28, thereby inducing a draft of air from outside the casing through the perforations 24, around the convolutions of the bellows 18 and thence out through the opening 26.

Figure 4:
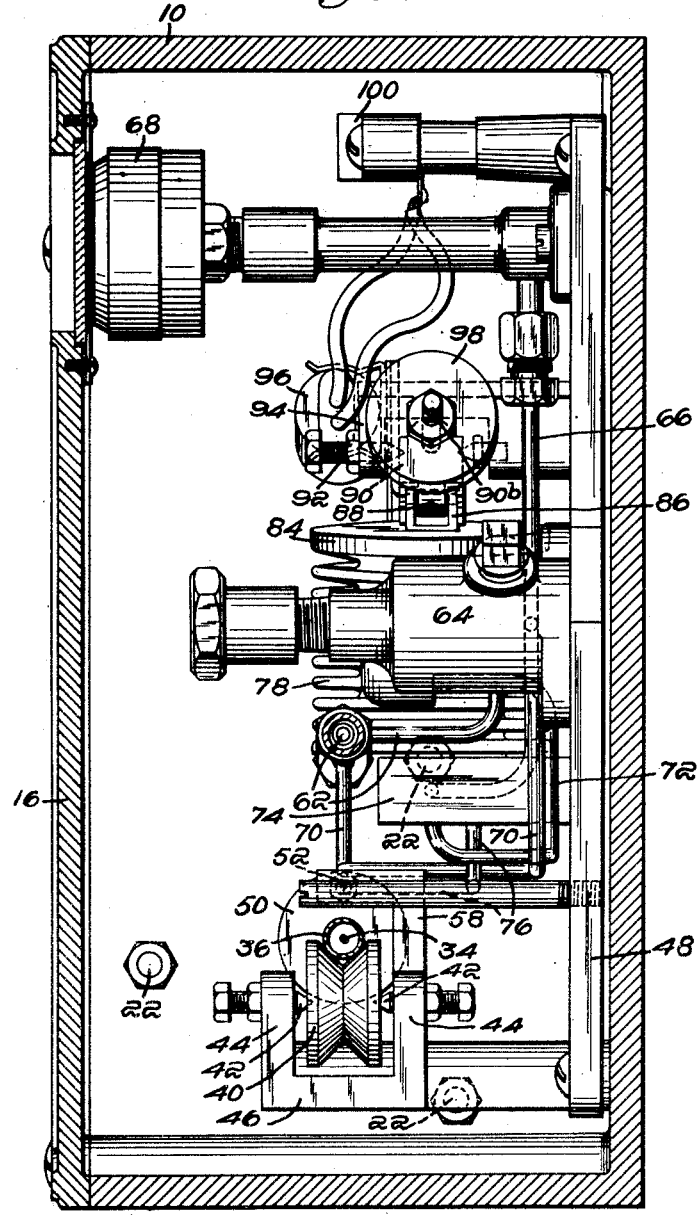
Figure 4 is a side elevation in section as on line 4—4 of Figure 1.

The bellows 18 contains highly volatile fluid which expands rapidly upon rise of temperature and contracts rapidly upon fall of temperature. The closed free end 18a of the bellows is provided with a hub 30 and set screw 32 adapted to receive and clamp the end of a wire 34 which extends through a tubular rod 36 and at its end remote from the bellows is clamped to the rod by another set screw 38. The rod rests on V-shaped rollers 40 (see Figure 4) pivotally supported on bearing pins 42 adjustably mounted in upstanding arms 44 of a bracket 46 extending forward from a vertically disposed base plate 48 secured to the back of the main casing.

As the bellows 18 expands or contracts it pushes or pulls the wire 34 and thereby effects movement of the tubular rod 36 along the rollers 40. Any tilting of the free end 18a of the bellows, usually incident to such elements, is accommodated by the flexibility of the wire so that the movement of the rod is a straight longitudinal one along the rollers. It is evident that the movement of the rod corresponds to the complete change of temperature or pressure because the expansion or contraction of the bellows caused by such complete change, is fully reflected in the movement of the rod. Hence the instant position of the rod is determined by the instant pressure within the bellows as this is established by the instant temperature of the air bathing the bellows.

Since, as initially stated, it is the purpose of this invention to provide a controller which is actuated by a change of condition regardless of the precise condition from which such change occurs, there is mounted on the rod 36 a cylinder or weight 50 which may be moved by and with the rod under certain conditions and which can then remain at rest while the rod continues to move in the same direction. The limited travel of this weight is determined in the instrument shown herein by the open end of a vent nozzle 52 and by the end of an adjusting screw 54. These elements are mounted in another pair of separated arms 56, 58 upstanding from the bracket 46. As here illustrated, the vent nozzle is attached to the right arm 58 as seen from the front of the instrument. Its opening is in the path of movement of the weight and so arranged that upon the weight being moved into contact with the nozzle the vent opening is closed. This vent-closing position of the weight is indicated in dotted outline in Fig. 3. Since movement of the weight to the right toward the nozzle is accomplished by movement of the rod to the right due to expansion of the bellows 18, it follows that the vent is closed and the subsequent control exercised in response to a rise in temperature. If, however, the vent nozzle were to be mounted in the arm 56, then it would be closed by the weight moving in response to a fall in temperature. As shown, however, movement of the weight to the left, due to a fall in temperature, brings the weight up against the end of adjusting screw 54.

The distance between the end of the adjusting screw 54 and the vent nozzle 52 determines the maximum travel of the weight and this in turn determines the maximum change of temperature which can occur in effecting the control desired. For example, the adjusting screw may be set so far from the vent nozzle that a rise of temperature of one degree is necessary to move the weight from contact with the screw into contact with the nozzle. If a more sensitive response is required, the adjusting screw can be turned toward the nozzle and thus reduce the distance between them so that a rise of only one-tenth of a degree in temperature will move the weight from one contact to the other. Thus by selected adjustment of the screw the maximum degree of temperature change required to effect the desired control may be determined. This maximum will not thereafter be exceeded although the control may be exercised at a lesser extent of change under certain sequences of temperature variation. For instance, suppose the weight is in contact with the screw and thereafter a rise of one degree in temperature occurs. Assume that this causes movement of the weight into contact with the vent. If now the temperature falls one-half of a degree, the weight will be moved one-half of its permissible travel toward the screw. If now the temperature again rises, the weight will return to its vent-closing position during the first one-half of a degree rise. Thus under such an assumed sequence of temperature variation the control may be exercised at a lesser extent of change than the maximum extent which the position of the adjusting screw insures will not be exceeded.

After movement of the weight with the rod to either limit of the weight's travel, the rod can continue to move if the temperature change exceeds that extent of change causing movement of the weight. For example, suppose that with the weight in contact with the adjusting screw the temperature is 65° F. If the screw is positioned to give a minimum sensitivity of one degree, then upon the temperature rising to 66° the weight will reach the nozzle and close its vent and bring about the control predetermined for the instrument to exercise. If now the temperature continues to rise the rod simply rolls along the rollers and slides through the weight, the latter being held against movement by its contact with the nozzle. Assume that the temperature ultimately reaches 85° before its rise ceases, and then it begins to fall. The first degree drop in temperature from 85° to 84° will effect movement of the weight from contact with the nozzle into contact with the adjusting screw. If the temperature continues to fall, the rod will roll along the rollers and slide through the weight. Suppose the temperature drops only to 80° and then rises again. During the first degree of rise from 80° to 81° the weight will be moved to its vent-closing position and again bring about the predetermined exercise of control.

Thus regardless of the temperature at which the change in temperature occurs the apparatus is actuated in response to such change. As heretofore described, the instrument disclosed is responsive to a predetermined rise of temperature. If a response to a predetermined drop in temperature is desired, then the vent nozzle 52 and set screw 54 would be in the reverse or opposite positions from those shown. That is to say, the vent nozzle would be in the path of the weight 50 as the latter travels to the left in response to a falling temperature, and the set screw would be on the right side of the weight. With this rearrangement, the screw would be set to determine the maximum drop in temperature necessary to actuate the instrument and effect the desired control.

As illustrative of means by which control may be exercised by the instrument, the mechanism shown associated with the vent nozzle will now be described. In the right wall of the main casing a male fitting 60 is provided for external connection with a source of air under pressure. Within the casing a tube 62 leads from this inlet fitting to a restriction fitting 64 mounted on the vertical base plate 48. From the main chamber of this restriction fitting, a tube 66 leads directly to a pressure gauge 68 which indicates the pressure of the air supply. Another tube 70 leads from the same chamber to the jet nozzle 28, hereinbefore mentioned, whereby the air movement through the auxiliary casing 12 is effected. From the main chamber of the restriction fitting a restricted passageway leads to a tube 72 which in turn leads to a bracket 74 provided with internal interconnected passageways. One of these leads to another tube 76 which connects with the vent nozzle 52. Another passageway leads upward in the bracket and opens into the interior of a bellows 78 which is otherwise air tight with the bracket. Thus the air passing the restriction of fitting 64 will pass into the passageways of the bracket 74 and thence through tube 76 and the vent nozzle 52 if the latter is open. The size of the vent opening is large enough to permit the air passing the restriction to escape to the atmosphere. Thus no internal pressure is imposed on the bellows 78 when the vent nozzle 52 is open. When the latter is closed by the weight 50 then the air flow through tube 72 enters the bellows 78 and rapidly establishes sufficient pressure therein to cause the bellows to expand upwardly. This pressure is transmitted by tube 80 to another gauge 82 to cause its pointer to swing to the "on" position. The plate 84 at the upper or free end of the bellows has an upstanding yoke arm 86 carrying a roller 88 which engages a depression in the bottom face of a lever 90 journaled on trunnions 92 carried by a bracket 94 mounted on the vertical base plate 48. On the left-hand arm 90a of this lever, as seen in Fig. 1, there is removably mounted a "Mercoid" tube 96 or mercury switch. The other arm 90b of the lever is threaded and carries an adjustable weight 98 which can be positioned to counterbalance substantially the weight of the lever and "Mercoid" on the opposite side of its fulcrum.

When the vent 52 is open and the bellows 78 is depressed or contracted, as shown in Fig. 1, the mercury in the "Mercoid" tube will be at its left end, but when the vent is closed and the bellows expands, the lever 90 and the "Mercoid" will be swung so that mercury will be shifted to the opposite end of the tube. If a single "Mercoid" tube is used, having only one pair of electric terminals, the tube may be mounted according to the control desired to be exercised on an electric circuit, or circuits (not shown) having connection with a terminal block 100. If such a circuit is to be closed in response to a rise in temperature, then the terminal end of the "Mercoid" will be that end nearer to the fulcrum of the lever 90. Conversely, if such a circuit is to be opened in response to a fall in temperature, then the terminal end of the "Mercoid" would be at the end of the tube more remote from the fulcrum. Obviously a double-ended "Mercoid" might be employed controlling two or more separated circuits.

Although I have particularly described the operation of my improved control means in response to a change of temperature causing a change of pressure within the bellows 18, it is obvious that the control might be effected regardless of what actually causes the change of pressure in the bellows to occur. At whatever condition of pressure a change of pressure takes place the apparatus will respond to the change and effect the control.

I claim:

1. Temperature responsive means comprising, in combination, fluid actuated control means; an element movable in accordance with a change in temperature; a second element slidably mounted on the first said element and movable thereby; and a fluid supply system for said fluid actuated means having a vent located in the path of movement of said second element adapted to be closed thereby during the initial movement of said first element to effect actuation of said control means; the said first element thereafter sliding with respect to said second element during continued movement of the first said element in response to said change in temperature.

2. Temperature responsive means comprising, in combination, an element movable in accordance with a change in temperature; a second element slidably mounted on the first said element and movable thereby; control means actuated by fluid pressure having pressure supply means with a vent opening in the path of movement of said second element adapted to be closed by said second element during the initial movement of the first said element in one direction; and an adjustable stop located in the path of movement of the said second element for limiting the movement of said second element to a predetermined open position with respect to said vent opening during the initial movement of the first said element in the opposite direction.

3. Temperature responsive means comprising, in combination, fluid actuated control means including a fixed vent opening; an element movable in accordance with a change in temperature; a second element slidably mounted on the first said element and movable thereby to open or close said vent opening; and means located in the path of movement of said second element whereby the extent of its travel with the first said element away from the vent opening is limited; the said elements sliding with respect to one another when the limit of travel of said second element is reached.

4. Temperature responsive means comprising, in combination, a rod movable in accordance with a change in temperature; a weight slidably mounted on said rod; and a nozzle having its vent opening arranged in the path of travel of said weight so as to be closed by said weight moving into contact with the nozzle; the said second element being moved by said first element to close said vent opening during the initial movement of said first element in response to a change of temperature, and thereafter sliding with respect to said first element as the latter continues to move in response to said change of temperature.

5. Temperature responsive means comprising, in combination, a bellows responsive to changes in temperature; a tubular rod mounted ahead of the movable end of said bellows for movement in the directions of expansion and contraction of said bellows; a wire element extending within said rod connecting its remote end with the movable end of said bellows; and means actuated by said rod in its movements for effecting control in response to changes of temperature.

6. Temperature responsive means comprising, in combination, a bellows anchored at one end and having a movable end; a tubular element arranged ahead of the movable end of said bellows, being mounted on rollers for movement in the same directions as the movement of the movable end of the bellows; a wire extending within the hollow of said tubular rod connecting its end remote from said bellows with the movable end of said bellows; and means actuated by said rod to effect control in response to changes of temperature affecting said bellows.

7. Temperature responsive means comprising, in combination, a bellows responsive to changes in temperature; an element connected with said bellows and moved thereby in accordance with said changes of temperature; a second element slidably mounted on the first said element and movable thereby; a pressure system having a vent opening in the path of movement of said second element and arranged to be closed thereby; a second bellows associated with said pressure system arranged to be expanded following closure of said vent opening; an electric switch; and means operatively connecting said second bellows and said switch for changing the position of said switch in response to movement of said second bellows; the said second element moving with said first element during its initial movement in response to a change of temperature and thereafter sliding with respect to said first element during continued movement of the first element in response to said change of temperature.

8. Temperature responsive means comprising, in combination, a thermally actuated element; a movable rod; anti-friction mounting means for said rod guiding the movements of the rod in predetermined directions; flexible means for transmitting tractive force between said element and said rod to effect the predetermined movements of said rod while permitting misalignment between said element and said rod; and means actuated by said rod to effect control in response to change of temperature affecting the said element.

9. Temperature responsive means comprising, in combination, a thermally actuated element anchored at one end and having its other end movable in accordance with temperature changes; a movable rod; anti-friction mountings for said rod arranged to determine the movements of said rod longitudinally along its axis; a flexible connection between the movable end of said element and the rod for effecting the determined movements of the rod despite tilting of the movable end of said element; and means actuated by said rod to effect control in response to changes of temperature affecting said element.

10. Temperature responsive means comprising, in combination, a thermally actuated element; a movable rod mounted on anti-friction means guiding the movements of the rod along its axis; a flexible connection between the element and the rod for effecting the movements of the rod in accordance with temperature changes; a member slidably mounted on said rod and movable thereby; fluid actuated control means having a vent in the path of movement of said member whereby upon movement of the rod in one direction said vent is closed by said member and opened upon movement of the rod in the reverse direction; and means limiting the movement of said member away from said vent; the said rod sliding with respect to said member when the latter reaches the end of its limit of movement toward or from the said vent.

11. Control means comprising, in combination, fluid actuated control means; an element movable in accordance with a change in pressure; a second element slidably mounted on the first said element and movable thereby; and a fluid supply system for said fluid actuated means having a vent located in the path of movement of said second element adapted to be closed thereby during the initial movement of the said first element to effect actuation of said control means; the said first element thereafter sliding with respect to said second element during continued movement of the first said element in response to said change in pressure.

12. Control means comprising, in combination, fluid actuated means; an element movable in accordance with a change in pressure; a second element slidably mounted on the first said element and movable thereby; a fluid supply system for said fluid actuated means having a fixed nozzle with a vent located in the path of movement of said second element; and an adjustable stop located in the path of movement of the second element for limiting the movement of said second element in direction away from said vent; the second element being moved against said nozzle during the initial movement of said first element in one direction of its movement and being moved against said stop during the initial movement of said first element in the opposite direction of its movement; the said elements sliding with respect to one another when the second element has contacted said nozzle or has contacted said stop.

13. Control means comprising, in combination, fluid actuated means including a fixed vent opening; an element movable in accordance with a change in pressure; a second element slidably mounted on the first said element and movable thereby to open or close said vent opening; and means located in the path of movement of said second element whereby the extent of its travel with the first said element away from the vent opening is limited; the said elements sliding with respect to one another when the limit of travel of said second element is reached.

14. Control means comprising, in combination, a pressure actuated element; a movable rod mounted on anti-friction means guiding the movements of the rod along its axis; a flexible connection between the element and the rod for effecting the movements of the rod in accordance with pressure changes; a member slidably mounted on said rod and movable thereby; fluid actuated control means having a vent in the path of movement of said member whereby upon movement of the rod in one direction said vent is closed by said member and opened upon movement of the rod in the reverse direction; and means limiting the movement of said member away from said vent; the said rod sliding with respect to said member when the latter reaches the end of its limit of movement towards or from the said vent.

15. Control means comprising, in combination, fluid actuated means; a fluid supply system for said fluid actuated means having a fixed vent; an element movable in accordance with a change in the conditions affecting it; a second element movable in the first said element toward and away from said vent; and stop means for limiting the movement of the second said element in direction away from said vent; the said elements being mounted with respect to one another to cause the second said element to be moved toward or away from said vent by the first said element during initial movement of the latter and thereafter permitting continued movement of the first said element after the second said element has reached said vent or said stop.

ALBERT J. LOEPSINGER.